United States Patent [19]

Rifkin

[11] Patent Number: 5,826,104
[45] Date of Patent: Oct. 20, 1998

[54] BATCH PROGRAM STATUS VIA TAPE DATA SET INFORMATION FOR DYNAMICALLY DETERMINING THE REAL TIME STATUS OF A BATCH PROGRAM RUNNING IN A MAIN FRAME COMPUTER SYSTEM

[75] Inventor: Donald Owen Rifkin, Colorado Spring, Colo.

[73] Assignee: MCI Communications Corporation, Washington, D.C.

[21] Appl. No.: 632,192

[22] Filed: Apr. 15, 1996

[51] Int. Cl.[6] ........................................... G06F 13/00
[52] U.S. Cl. .................... 395/835; 395/155; 395/839; 395/740; 395/671
[58] Field of Search ........................... 364/401; 355/209, 355/14; 395/155, 839, 740, 671, 559, 835

[56] References Cited

U.S. PATENT DOCUMENTS

| | | | |
|---|---|---|---|
| 4,511,243 | 4/1985 | Smith | 355/14 |
| 5,036,361 | 7/1991 | Filton | 355/209 |
| 5,325,290 | 6/1994 | Cauffman | 364/401 |
| 5,483,631 | 1/1996 | Nagai | 395/155 |

*Primary Examiner*—Thomas C. Lee
*Assistant Examiner*—Hassen A. Mia

[57] ABSTRACT

An automated method to determine the real-time status of a currently running batch program on a mainframe computer system. Output from a tape management reporting system is processed so that relevant information pertaining to the progress of a currently running batch program is extracted and derived therefrom. New reports are generated that reveal the current status of the batch program in terms of the processing time of the dataset associated with the batch program. The new reports disclose useful status information such as the total number of volumes that comprise the dataset, the sequence number of the current volume being processed, the amount of time the currently running batch program used to process the volumes already processed, and the amount of time the previously run batch program used to process the volumes that have not yet been processed by the currently running batch program. Several reports are presented in a concise format to enable a reader to quickly determine the status of any currently running batch program.

5 Claims, 6 Drawing Sheets

BATCH PROGRAM STATUS VIA TAPE DATA SET INFORMATION FOR DYNAMICALLY DETERMINING THE REAL TIME STATUS OF A BATCH PROGRAM RUNNING IN A MAIN FRAME COMPUTER SYSTEM

BACKGROUND OF THE INVENTION

1. Field of the Invention

The present invention relates generally to the management and operation of mainframe computer systems, and more particularly to an automated process for dynamically determining the real-time status of batch programs being run on large mainframe computer systems.

2. Related Art

Many industries make use of mainframe computer systems to process large quantities of data on a regular basis. Often such data is stored on magnetic tapes that are arranged in groups known as datasets. Typically datasets comprise a plurality of physical tapes or 'volumes'. The volumes that comprise a typical dataset are sequentially numbered from 1 to n, where n is the total number of volumes in a particular dataset. These numbers are referred to as the volume sequence number. Each dataset volume is mounted sequentially according to its sequence number into a tape input/output device. Such datasets are read by batch programs running on mainframe computer systems. The term batch program, as used herein, refers to a series of instructions executed on a mainframe computer system. Such batch programs are generally used to process large volumes of data. The terms batch program(s), batch job(s), and job(s) are synonymous and are used interchangeably herein.

Often datasets comprise dozens of volumes. Batch programs that use these large datasets as input may take hours or even days to complete. As an example, consider a typical task confronted by a long distance telephone provider. Data concerning telephone calls initiated by all of the service provider's customers is collected from a plurality of communication switches distributed throughout a large geographical region that defines the boundaries of the long distance telephone network. This vast amount of data is organized, sorted and ultimately stored on tape datasets to be used for data processing within the telecommunications company. The datasets are typically processed on a monthly basis. For example, customer bills are generated each month by running one or more batch programs against such datasets.

In order to optimize the use of computer systems and to minimize the affect of breakdowns and the like, the data is generally broken down into subgroups of datasets. For example, the vast amount of data that comprise all of the telephone calls made by all of the service provider's customers for one month may be broken down alphabetically, or by geographical regions. The criteria used to break the data down into sub-groups is irrelevant as long as the data is systematically separated into manageable datasets.

For the sake of simplicity and the examples used herein, suppose such data is broken down into nine sub-groups, thereby generating nine datasets each month. Each dataset comprises a plurality of volumes (around thirty, for example). Further suppose that the communications company has three different data processing facilities of equal magnitude. Thus in order to optimize the use of computer facilities, three datasets are electronically or physically transported to each of the three data processing facilities to be used as input for each of the required monthly batch jobs.

Each batch job can take from several hours to several days to complete. Additionally in order to meet customer demands and stay competitive, it is imperative that these jobs be run and completed in a timely manner each month. It is therefore very important to be able to monitor the progress of such batch jobs so that delays caused by breakdowns, errors, and the like can be identified and corrected in a timely manner. Further, since the batch programs are distributed among several data processing centers, it is desirable to monitor such progress from various remote locations.

Further, only one batch program can have access to a particular dataset at one time. This often causes what is known as contention, where one job requests the use of a dataset that is already in use by another job. It would be desirable to be able to quickly determine the progress of a batch program that is currently running in order to decide whether to terminate the job in favor of a new one, or to wait until the current job is complete. For example, suppose a currently running batch program takes 26 hours to complete. Further, suppose that a four hour batch program is in contention with the dataset that is being run against the 26 hour batch program. Without the benefit of the current status regarding the progression of the 26 hour batch program, it would be difficult to make an informed decision whether to terminate the currently running batch program in favor of the four hour batch program.

Conventional methods used to determine such status information are timely and cumbersome. Further, such methods generally require the skills of a person knowledgeable in the cryptic languages and terminologies associated with mainframe computer systems. Conventional methods used to determine the progress of a current job running on a mainframe computer system typically requires an operator to manually sort through large quantities of data provided by a tape management system, mainframe computer system log, or the like.

Typically, reports generated by tape management systems include an abundance of information not relevant to the status of batch jobs. Thus, such conventional methods generally include the task of filtering out large quantities of extraneous data from the relatively small amount of relevant information contained therein. Additionally, new information not reported by such systems must be derived from the data provided by these conventional methods. The inherent problems associated with the conventional methods as described herein, are partly due to the fact that the system utilities used to determine batch job status were never designed to provide information directly relating to batch jobs. For example, tape management and reporting systems report information pertaining to the use and status of tape datasets. Information pertaining to batch job status is only reported incidentally. Tape management systems provide pre-defined information relating the details of each volume within a particular dataset. The information provided includes for example, the volume serial number, accounting information, the name of the job that created the dataset, the age, the number of times used, the date and the time of its last use, and the name of the most recent job that had access to the dataset.

As stated, the primary purpose of tape management reporting systems is to report data related to datasets, not batch jobs. Consequently, most of the data reported by such tape management systems is irrelevant to the task of determining the progress of a particular batch program that is being executed on the mainframe computer system. Therefore, much time is needlessly spent sorting through large quantities of extraneous data to determine the status of a currently running job. As a result, such methods are seldom practiced and the desired information is typically done without.

Another conventional method used to determine the status of a currently running batch job makes use of the mainframe computer's system log. Like the tape management system described above, system logs contain a vast amount of data not relevant to the sought-after information pertaining to batch job status. Data reported by such system logs include the messages generated by the batch programs during their execution, error messages, responses by the computer operators, accounting information, user information, and the like. The same inherent problems associated with using tape management reporting systems to determine batch job status are present when using system logs to determine the same. A typical system log can contain on the order of 100,000 lines of data which must be sorted through in order to extract the small amount of data relevant to a batch job's progress.

Further, system logs are often updated on a low priority basis. Thus data pertaining to currently running jobs is often not current when viewing such information from a remote site or system. This leads to the time consuming requirement of logging-off from one system and logging-on to different systems in order to obtain current system log information. In addition to this process being time consuming, it often raises the issue of security clearance rights. Direct logon to remote systems generally requires pre-authorized security clearances. Thus, unless such clearances are in place, system logs cannot be accessed from remote sites or systems.

SUMMARY OF THE INVENTION

The present invention discloses a system and method for dynamically determining the real-time status of a batch program running on a large mainframe computer system. This is accomplished by running a program on a computer system that interfaces with the output data from a tape management and reporting system. Such output data is scrutinized by the present invention in order to extract out only those portions that are relevant to the progress of a particular batch program that is currently being executed. Additionally, new data pertaining to the progress of a batch program is derived from the tape management system report data and several new reports are generated therefrom.

The new reports generated by the present invention provide the current progress of a batch program and provide a means to estimate the completion time for a currently running batch job. The estimate is based on several factors including the total number of volumes contained in the dataset, the processing time for each volume that has been processed, and the previous processing time for each volume that has not yet been processed by a currently running batch program. The new reports provided by the present invention allow instant access to the desired information and require little or no expertise to decipher.

FEATURES AND ADVANTAGES

Accordingly, a feature of the present invention is that it provides current information about the progress of a batch program running on a mainframe computer system.

An advantage of the present invention is that it provides current information about the progress of a batch program running on a mainframe computer system so that problems, errors, breakdowns and the like can be identified and corrected.

Another advantage of the present invention is that it provides the current progress of a batch program running on a mainframe computer system so that decisions involving dataset contentions may be made on an informed basis.

A further advantage of the present invention is that it provides the current progress of a batch program running on a mainframe computer system automatically, with little effort, thereby allowing users to determine such progress on a frequent basis so that problems can be identified in a timely manner.

Still further, an advantage of the present invention is that it provides the current progress of a batch program running on a mainframe computer system from remote locations, without requiring additional security clearances needed to log-on to remote mainframe computer systems.

Further features and advantages of the invention, as well as the structure and operation of various embodiments of the invention, are described in detail below with reference to the accompanying drawings.

BRIEF DESCRIPTION OF THE FIGURES

The present invention will be described with reference to the accompanying drawings, wherein.

In the drawings, like reference numbers generally indicate identical, functionally similar, and/or structurally similar elements. The drawing in which an element first appears is indicated by the leftmost digit(s) in the reference number.

DETAILED DESCRIPTION OF THE PREFERRED EMBODIMENTS

Figure 1:
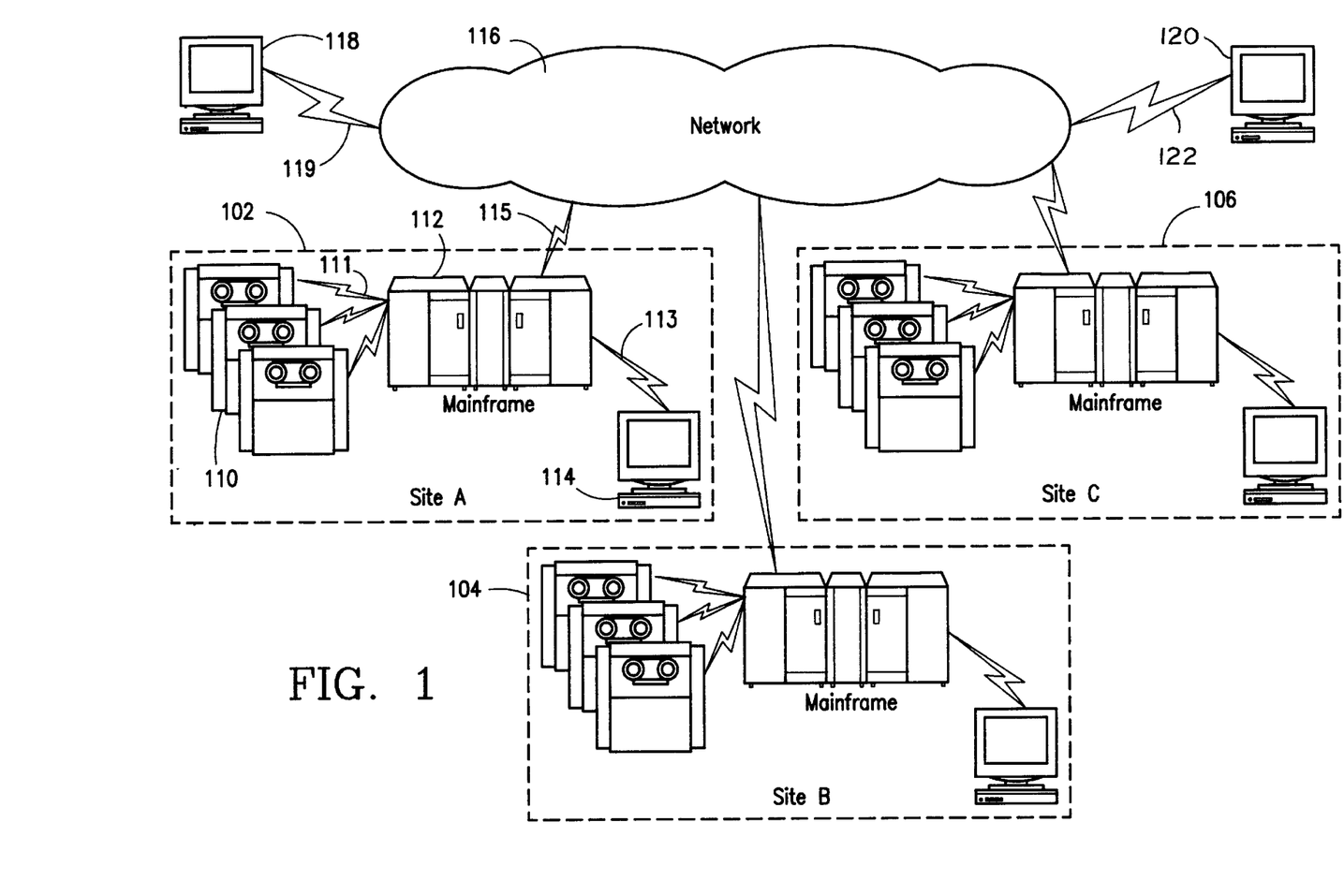
FIG. 1 is a block diagram showing the operative environment according to an embodiment of the present invention.

In order to describe the present invention it is useful to describe a typical operating environment in which the present invention may be used. FIG. 1 is a block diagram of a data processing system according to an embodiment of the present invention. The data processing system comprises three data processing centers, site A 102, site B 104, and site C 106. The elements that comprise each data processing center will be described with reference only to site A 102, but it should be appreciated that the other two sites, site B 104 and site C 106, comprise the identical or similar elements as site A 102.

Each site comprises a plurality of tape input devices 110, a mainframe computer system 112 and a local operator terminal 114. The plurality of tape input devices 110 serves as a means to input data to the mainframe computer system 112 via communication links 111. Local operator terminal 114 is in data communications with mainframe computer system 112 via communication link 113. The mainframe computer system is coupled with a computer network 116 via communication link 115. A plurality of remote operator terminals such as remote operator terminal 118 and remote operator terminal 120 are coupled with the computer network 116 via communication links 119 and 122 respectively.

In order to describe the characteristics and use of the present invention, an example of an implementation that may be used by a telecommunications company, as previously described herein, will be discussed. In this scenario, a vast amount of data pertaining to all of the telephone calls made by all of the service provider's customers is processed on a monthly basis. Such processing is carried out by a plurality of batch jobs executed by the data processing systems within each of the three sites, site A 102, site B 104 and site C 106.

For purposes of this example, the monthly data is broken down alphabetically into nine distinct datasets. Every month, exactly three data sets are transported to each data processing center, site A 102, site B 104 and site C 106, for local processing of the data sets. Identical batch jobs within all three sites are run against each of the three datasets located therein. As previously discussed, each batch job may take from several hours to several days to complete.

The execution of the batch jobs may be controlled (i.e. initiated, terminated, monitored, etc.) locally via an operator computer terminal, such as the local operator terminal 114 (for a batch job running on mainframe 112). Additionally, such batch jobs may be controlled remotely via the computer network 116. For example, a batch job running in site A 102 may be controlled by a user stationed at the remote operator terminal 118 or the remote operator terminal 120, via the computer network 116.

As previously stated, only one batch job can have access to a particular dataset at a time. Consequently, if a user at the remote computer terminal 118 would like to execute a batch job at site A 112 using a particular dataset that is already in use by mainframe 112, a condition known as contention arises. In order for the desired program to be executed, the program already in progress must be terminated. Thus the user at the remote operator terminal 118 must decide whether to terminate the program being executed within the mainframe 112 in favor of the new program. By using the present invention, the user at the remote operator terminal 118 can determine the status of the running application in terms of its progress. This information will enable the user to make an informed decision regarding the contending batch programs.

The user at the remote computer operator terminal 118 determines the name of the dataset which is the subject of the preceding contention. The dataset name is entered as a parameter into an embodiment of the present invention at the remote operator terminal 118. A report is produced by the present invention that informs the user about the progress of the running batch program. Additionally, information providing a means to estimate the time of completion of the running program is also presented. The contents of the reports provided by the present invention will be subsequently discussed herein.

In addition to providing information in the event of dataset contentions, the present invention provides a means to monitor jobs in order to detect problems. Such monitoring may take place from any location that is coupled to any other location via the computer network 116. For example, any job running on any mainframe, such as mainframe 112, may be monitored by using the present invention from any operator terminal coupled to the computer network 116, such as operator terminals 118, 120 and 114. This aspect of the present invention provides a means to systematically and frequently monitor the status of executing batch programs for early error detection and problem resolution. For example, before the availability of the present invention, certain batch jobs may have been monitored only twice daily due to the high amount of resources required to gain access to such information. By using the present invention, all batch jobs can be monitored much more frequently, for example, every half hour. Frequent monitoring of the batch programs enables the early detection of anomalies regarding the progression of the running batch programs.

The present invention may be used to ascertain information about any batch job that was last executed against a particular dataset. However, the invention is particularly useful to ascertain information about a batch job which is currently being executed. Thus in the examples used below, it is assumed that the present invention is being used to determine status of a batch program that is currently being executed on a mainframe computer system.

Figure 2:
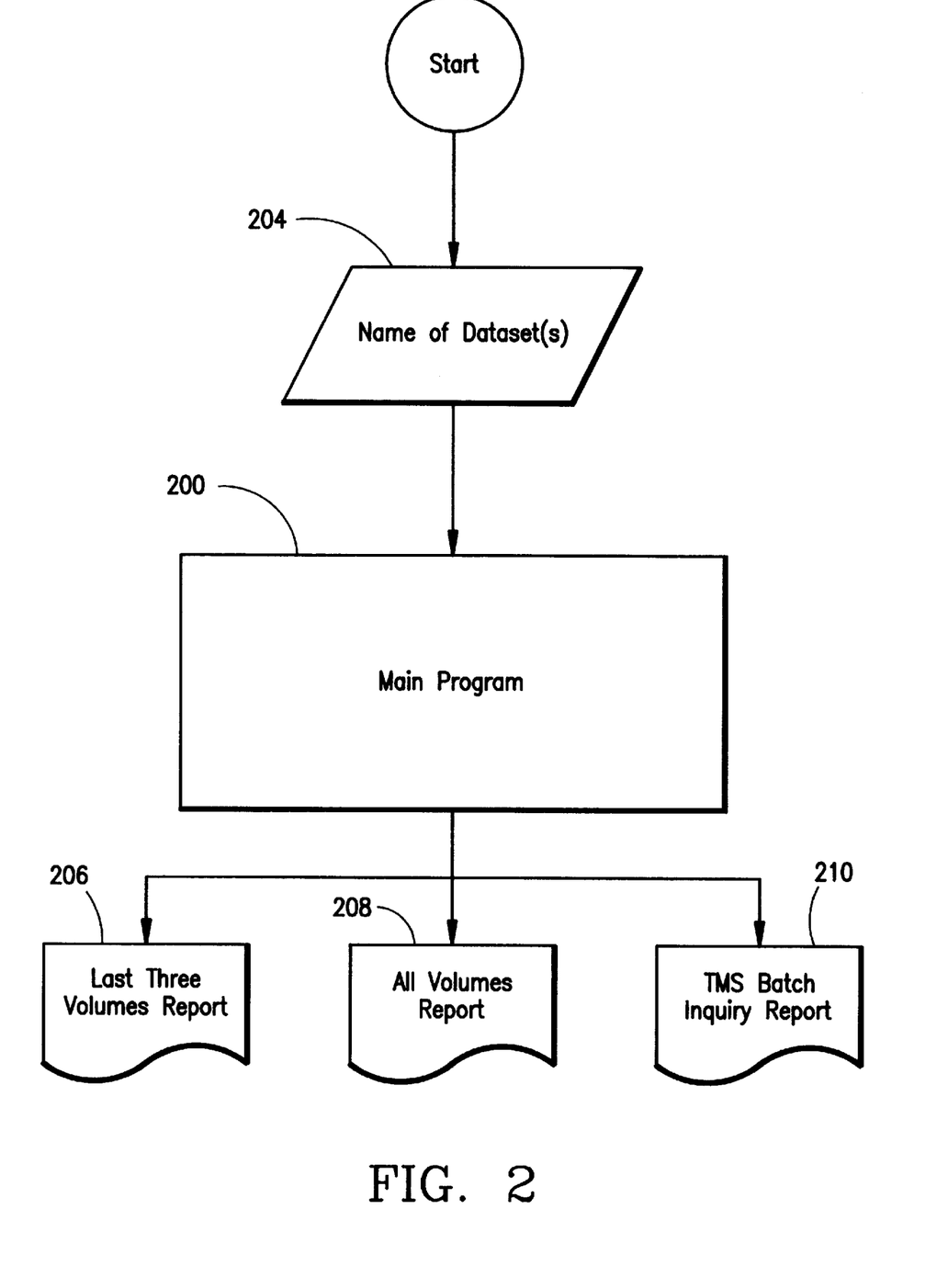
FIGS. 2–4, and 6 are flowcharts depicting the preferred operation of the present invention.

The operation of the present invention will now be described with reference to the flowcharts in FIGS. 2–4. FIG. 2 shows the input(s) and outputs of the present invention. The main program 200 accepts one or more dataset name(s) 204 as input. The output to the main program 200 comprises three reports: the Last Three Volumes report 206; the All Volumes report 208; and the Tape Management System(TMS) Batch Inquiry report 210. Note that this is one example of an implementation of the present invention. Different implementations will generate different and or/additional reports than those depicted by the flowchart in FIG. 2.

All of the reports generated by the present invention report data pertaining to the dataset(s) specified in the name of dataset(s) parameter 204. If more than one dataset name is specified, each of the three reports 206–210 will comprise a separate section for each of the datasets specified. The All Volumes report 208 contains information about all of the volumes that comprise the dataset(s) specified in the name of dataset(s) parameter 204. This report comprises one line of information about each volume in each dataset in sequential order beginning with volume one, and ending with the last volume sequence number in each dataset. Such information includes the volume sequence number, the volume name, and information relating to the last use of the volume. Such information includes the name of the batch job that last accessed the volume, the last tape drive in which the volume was last mounted in, the time and date of the last mounting, and the elapsed time between the mountings of sequential volumes.

The Last Three Volumes 206 report comprises similar information as the All Volume reports 208, but only with respect to the last three volumes that were accessed by the currently running batch program. The Last Three Volumes report 206 contains enough information and is presented in a concise format as to enable a user to quickly determine the general status of a currently running batch job. Such status includes the total number of volumes to be processed by the batch job, the current volume mounted in the tape input device, and the processing time of the previous three dataset volumes. The third report 210 is merely a reproduction of the Tape Management System report that is used by present invention to generate the two preceding reports.

Figure 3:
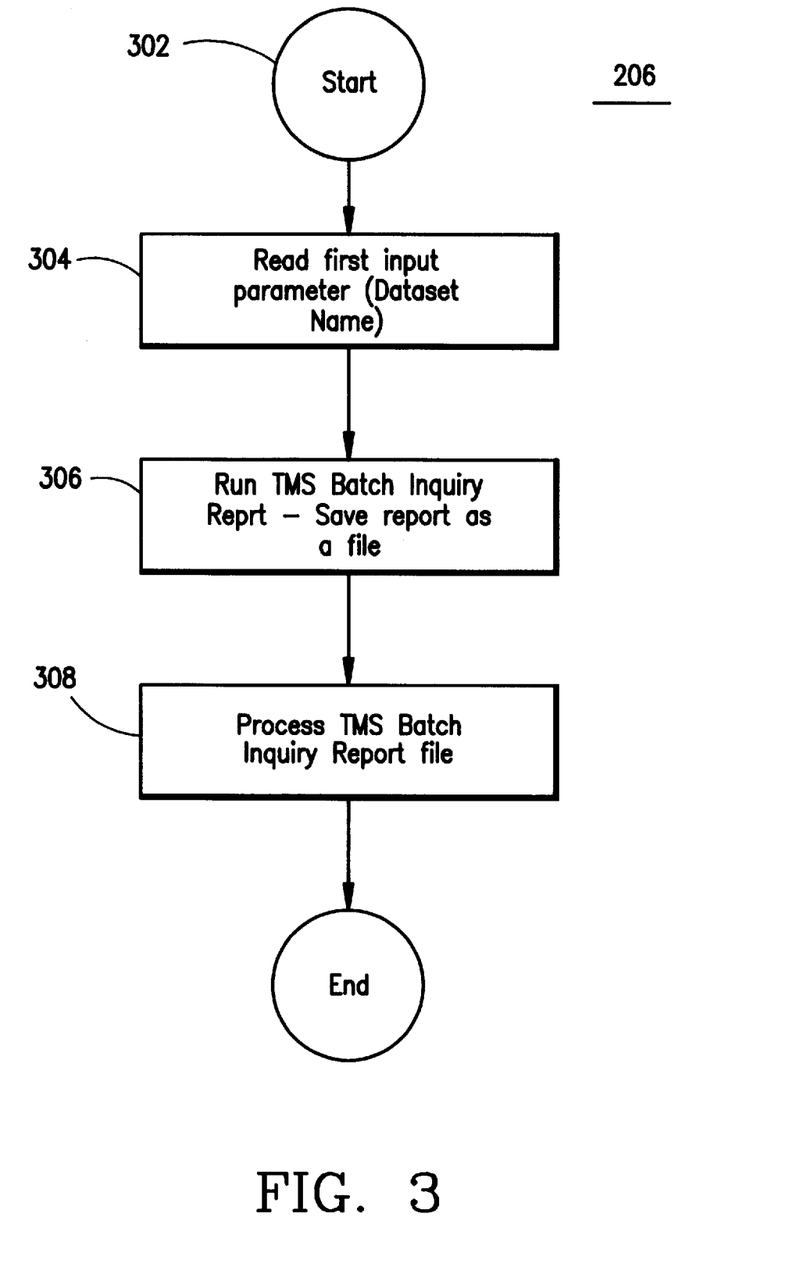

The flowchart in FIG. 3 depicts the processing of the main program 200. The process begins with step 302 where control immediately passes to step 304. In step 304, the input parameter(s) 204 is (are) read. This can be one or more dataset names. The name of a dataset that is associated with a particular job is determined by well known methods. In the event of a contention, the name of the dataset is provided by the computer system that reported the dataset contention.

In step 306, a Tape Management System (TMS) program is run so that a report is generated for each dataset provided by the input parameter 204. As stated previously, these reports contain a relatively large amount of information about the dataset. A typical TMS report contains over 50 fields of information associated with each volume in the dataset. Such information may include, for example, the volume creation date, the name of the batch program that created the dataset, the name of the first, next, and previous volume in the dataset, user and account information regarding the previous use of the dataset, the format of the data, and the time and date of the previous mounting of the volume. The TMS report that is generated by step 306 is maintained in a computer readable file to be processed by the present invention in step 308. This ends the process for the flowchart in FIG. 3. Details of the processing that takes place in step 308 will now be described.

Figure 4:
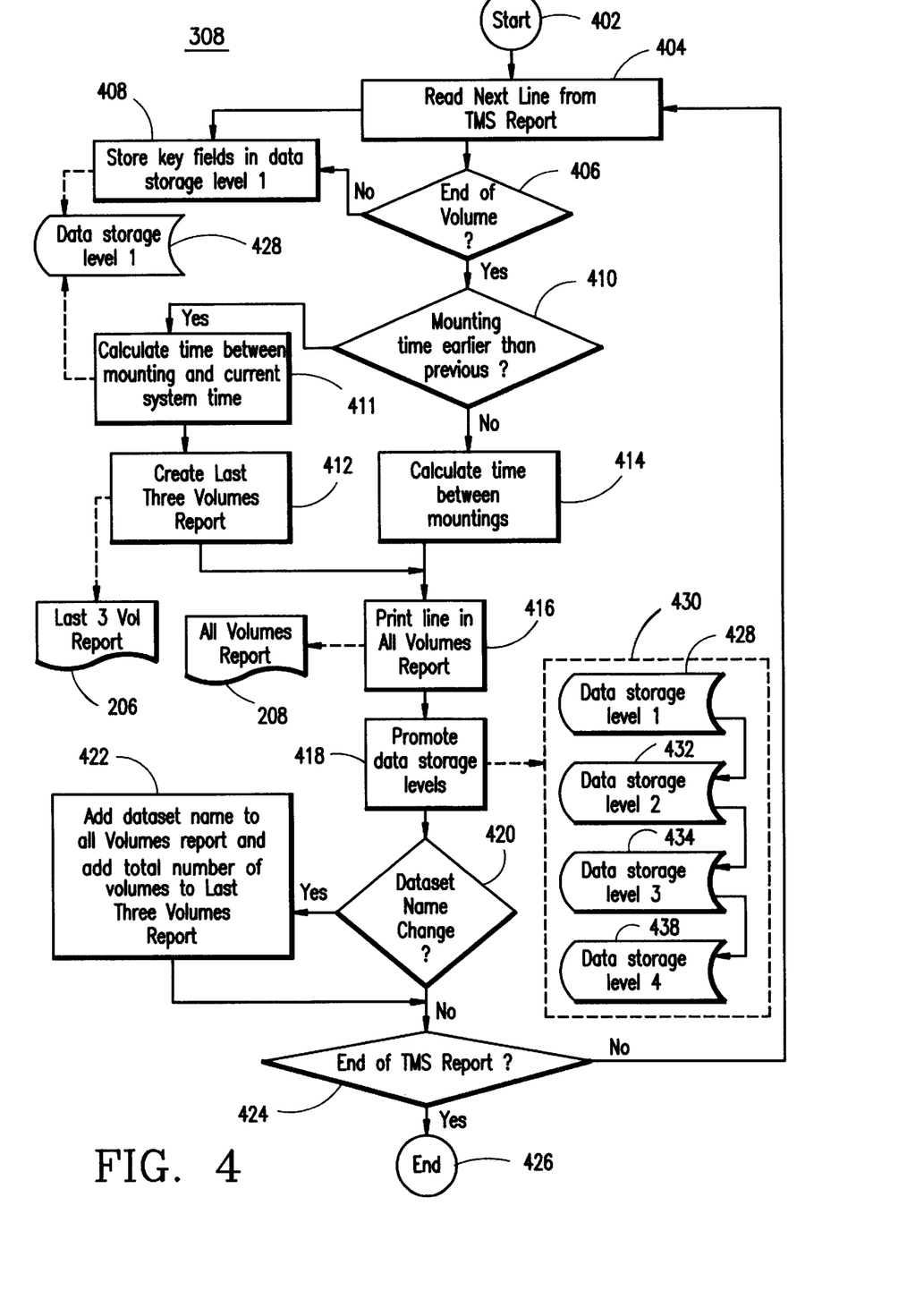

The flowchart in FIG. 4 depicts the processing that takes place in step 308. The process begins with step 402 where control immediately passes to step 404. In step 404 a line from the TMS report generated by step 306 is read. Step 404 reads one line at a time from the TMS report. The first line of the TMS report is read the first time step 404 is executed. Another line from the TMS report is read each time step 404 is subsequently executed. In step 406, the program tests for an end of volume indication. The dataset information provided by the various TMS reports generally sort data by the volume sequence number. Typically, the data is presented in a sequential fashion beginning with the first volume and ending with the last volume in the dataset. The criteria used for an end of volume indication varies with the format of the particular TMS report. For example, a blank line, a carriage return, a null character, or a volume name change, can all indicate an end of volume condition. The specific method used to determine an end of volume condition for a particular implementation of the present invention will be apparent to persons skilled in the relevant art(s).

If an end of volume is not indicated by step 406, step 408 is processed. In step 408, predefined key fields related to the desired data pertaining to batch job status are stored in working data storage level 1 428. As stated, much of the information contained in the TMS report is not relevant to the status of a batch program. Thus, the relevant information is filtered out from the irrelevant information by storing such relevant information in step 408. Examples of predefined key fields include the volume name, the volume sequence number, the last date and time such volume was mounted, the name of the last batch job that accessed the dataset, and the identification of the tape input device that such volume was last mounted on.

The specific fields that are retained will depend on the desired content of the output reports (described below), and the specific format of the TMS report that is processed by the present invention in step 306. The particular processing steps 404–408, that are used to process and interpret each line of the TMS report will depend on the known data format and the particular data fields included in the TMS report. The logic required to carry out such processing steps will be apparent to persons skilled in the relevant art(s).

If step 406 indicates an end of volume condition, processing continues with step 410. Note that at this point, all of the data pertaining to the present volume just processed by steps 406–408, is currently stored in data storage level 1 428. This volume is referred to herein as the present volume. In step 410, the program determines whether the mounting of the present volume occurred earlier in time than the mounting of the previous volume. A positive response to this query indicates that the previous volume was the latest volume processed by the currently running batch job. This condition indicates that the previous volume processed by flowchart 308 is currently mounted and the present volume is next in line to be mounted. Control passes to step 411.

In step 411 the elapsed time between the mounting of the previous volume (which is presently mounted within the tape drive), and the system time is calculated. This step is performed in order to detect anomalies. For example, an abnormally long elapsed time calculation in step 411, generally indicates that a problem exits regarding the execution of the currently running batch program (such as a program crash, operator intervention, an endless program loop, a corrupted dataset volume, etc.). A reader of a report (such as the Last Three Volumes report 206), provided by the present invention will detect such anomalies by noting the elapsed time associated with the presently mounted dataset volume, as calculated by step 411. Next control passes to step 412.

In step 412 the Last Three Volumes report 206 is generated. The process used to create this report will be subsequently described below. If step 410 indicates that the mounting of the present volume occurred later than the mounting of the previous volume, control passes to step 414.

In step 414, the elapsed time between the mounting of the present volume and the mounting of the previous volume is calculated. The elapsed time for each volume is generally not directly provided by TMS reports. However, the time and date of the latest mounting is reported for each volume in the dataset. Thus, by examining the time and date of the last two volume mountings, the elapsed time each dataset remained in a tape input device may be calculated. For example, suppose that the result of step 406 indicates an end of volume condition after reading information pertaining to volume two, and the previous volume was volume 1. In step 414, the difference in time between the mountings of volume one and volume two is calculated. The result of this calculation is the batch program processing time for the previous volume (volume 1 in this case). Such information is included in the 'elapsed time' field of both the All Volumes report 208, and the Last Three Volumes report 206.

In step 416, one line of the All Volumes report 208 is generated. Each line in the All Volumes report 208 contains information about a particular volume in the dataset. The elapsed time field however, contains information pertaining to the batch program processing time of the previous volume. Thus, the line associated with the first volume in each dataset does not contain information in the elapsed time field. Similarly, the volume in which step 410 determined had an earlier mounting time than the previous volume, does not contain information in the elapsed time field. Instead these fields contain a conspicuous notation so that a user can quickly identify the volume in which the batch program is currently accessing.

Additionally, the information presented in the All Volumes report 208, which follows the information associated with the currently accessed volume, pertains to the previous execution of a batch program that was run against the dataset. The batch program previously executed against the dataset may or may not have been the same batch program that is currently being run. The data reporting the elapsed time associated with each dataset for the previous batch job execution is presented in order to provide an estimate for the current execution. The accuracy of this estimate will depend on several factors. Such factors include whether the previous batch program and the current batch program are the same, and whether the number of users logged on to the mainframe computer system is similar (i.e. whether similar computer response times are expected). Accordingly, sufficient information such as the identification and processing times of the previous running batch program is presented in the All Volumes report 208, so that these and other such factors can be taken into account by the report reader.

As shown in step 416, data stored in data storage level 1 428 is printed to the All Volumes report. The data storage level 1 contains information from step 408 that is relevant to the batch program status as previously described herein. Next in step 418, the data storage levels 430 are promoted. According to one embodiment of the present invention, four data storage levels are maintained—data storage level 1 428, data storage level 2 432, data storage level 3 434, and data storage level 4 438. The promotion step 418 functions as follows. First the data from data storage level 3 434 is moved to data-storage level 4 438. Next, the data from data storage level 2 432 is moved to data-storage level 3 432. Finally, the data from data storage level 1 428 is moved to data-storage level 2 432. In this fashion, data collected from repeated executions of step 408 is maintained for the last three volumes in the dataset and the current volume being processed by the present invention.

Figure 6:
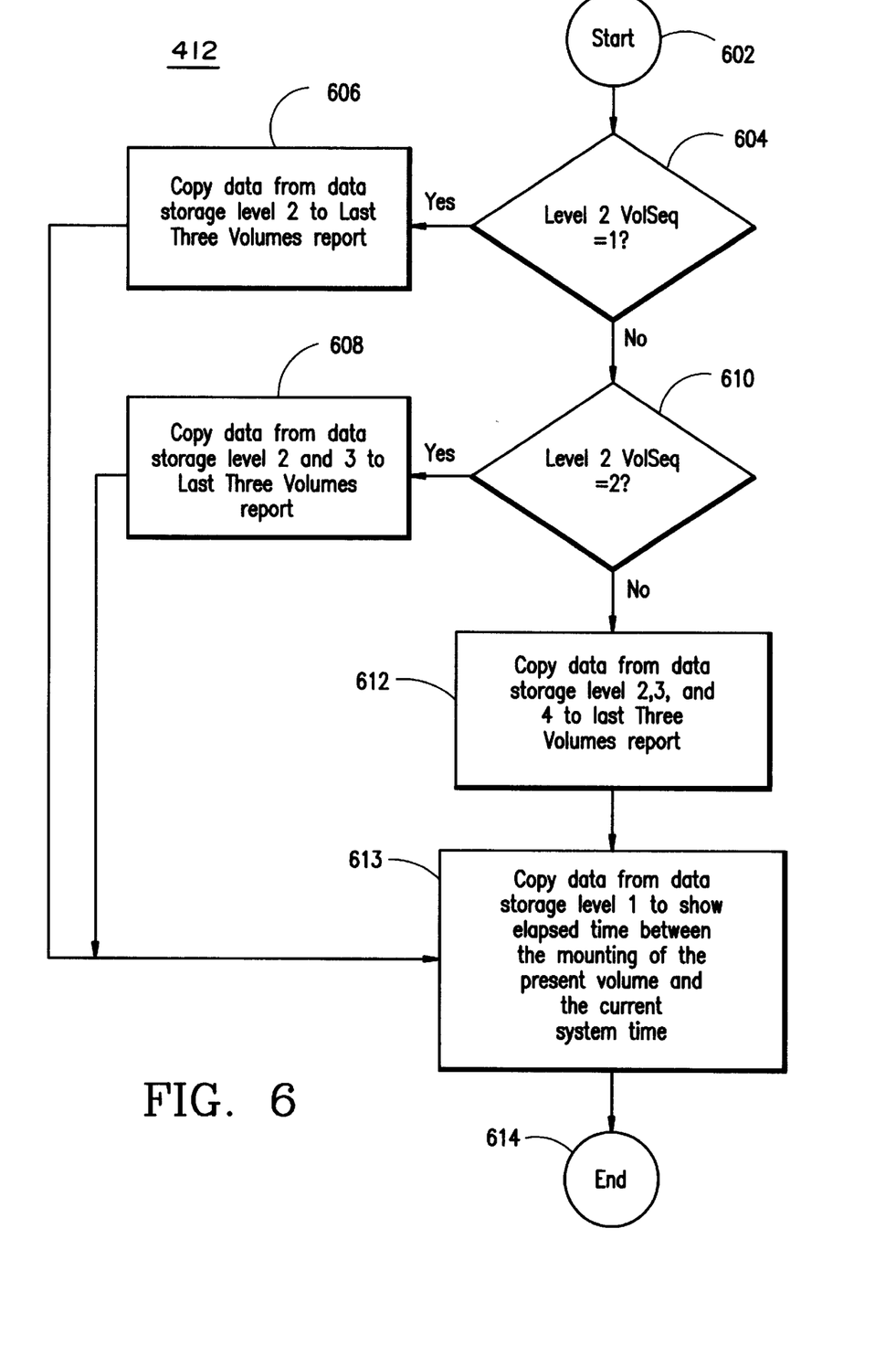

The creation of the Last Three Volumes report 206 depicted by step 412 will now be described with reference to FIG. 6. The flowchart in FIG. 6 begins with step 602 where control immediately passes to step 604. In step 604 the data in data storage level 2 432 is examined to determine whether the information relates to volume sequence number 1. If so, the volume currently being accessed by the batch program is volume 2. Consequently, the Last Three Volumes report 206 should only contain information about volume 1. Accordingly, the information pertaining to volume 1 is copied into the Last Three Volumes report 206 from data storage level 2 432. Next as step 614 indicates, the process is complete.

If step 604 determined that the information contained in data storage level 3 does not pertain to volume 1, control passes to step 610. In step 610, the data in data storage level 2 432 is examined to determine whether the information relates to volume sequence number 2. If so, the volume currently being accessed by the batch program is volume 3. Consequently, the Last Three Volumes report 206 should only contain information about volume 1 and volume 2. Accordingly, information pertaining to volume 1 and volume 2 is copied into the Last Three Volumes report 206 from data storage levels 2 and 3 (432 and 434 respectively). Next as step 614 indicates, the process is complete.

Step 612 is processed if both of the last two conditions (steps 604 and 610) are false. In this case, valid information pertaining to the Last Three Volumes that were accessed by the batch program are contained in data storage levels 4, 3, and 2 (438, 434, and 432), respectively. Accordingly, information pertaining to the last three volumes is copied into the Last Three Volumes report 206 from data storage levels 4, 3, and 2 (438, 434, 432) respectively. Finally, as step 614 indicates, the process is complete.

Figure 5:
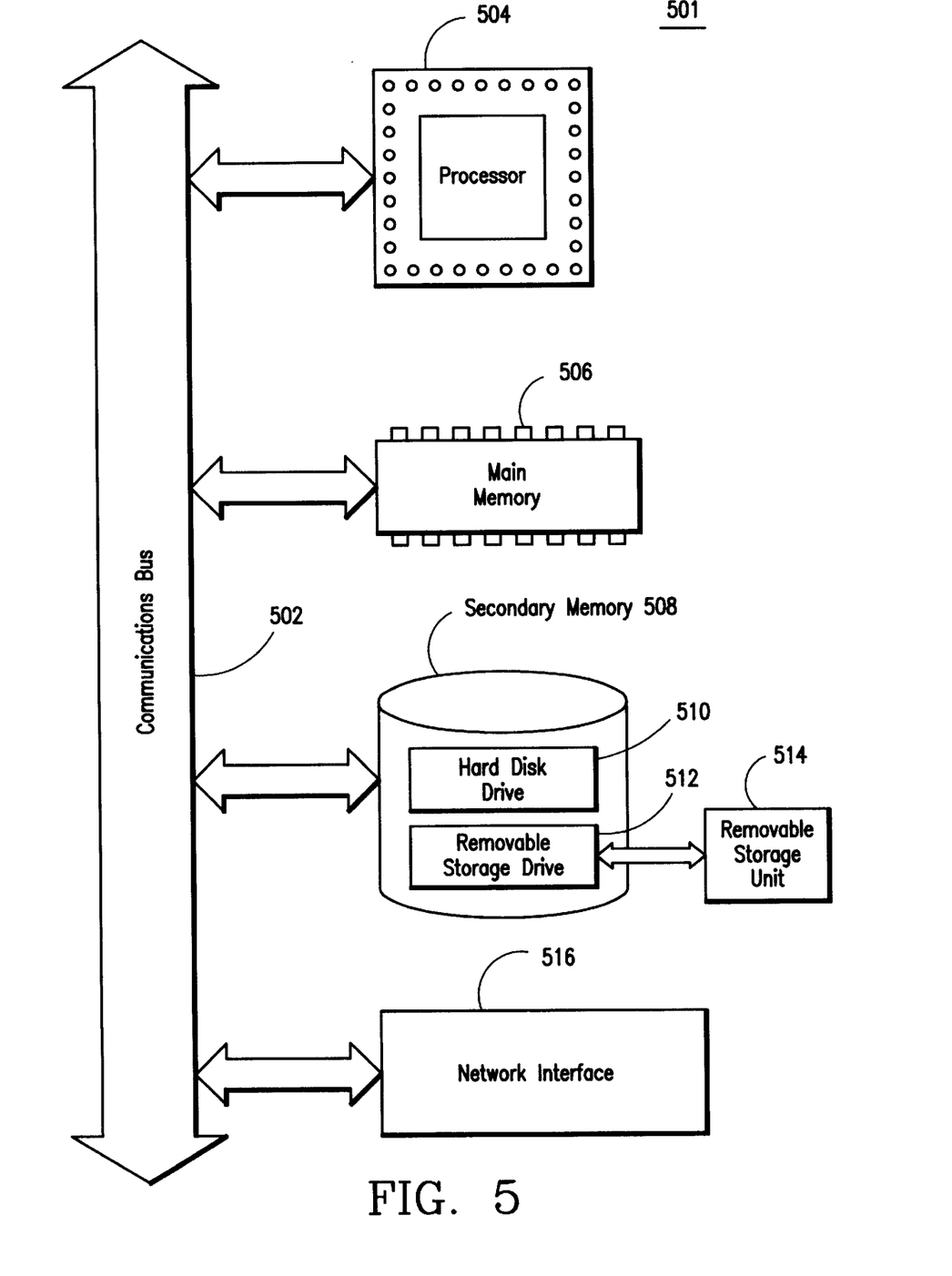
FIG. 5 is a block diagram of a computer system useful for implementing components of the present invention.

In one embodiment, the present invention may be embodied in a general computer system. An exemplary computer system 501 is shown in FIG. 5. The computer system 501 includes one or more processors, such as processor 504. The processor 504 is connected to a communication bus 502.

The computer system 501 also includes main memory 506, preferably random access memory (RAM), and a secondary memory 508. The secondary memory 508 includes, for example, a hard disk drive 510 and/or a removable storage drive 512, representing a floppy disk drive, a magnetic tape drive, a compact disk drive, etc. The removable storage drive 512 reads from and/or writes to a removable storage unit 514 in a well known manner.

Removable storage unit 514, also called a program storage device or a computer program product, represents a floppy disk, magnetic tape, compact disk, etc. As will be appreciated, the removable storage unit 514 includes a computer usable storage medium having stored therein computer software and/or data.

The computer system 504 also includes a network interface 516 which provides for communication via the telephone network as discussed herein. Computer programs (also called controllers) are stored in main memory and/or the secondary memory 508. Such computer programs, when executed, enable the computer system 501 to perform the features of the present invention discussed herein. In particular, the computer programs, when executed enable the processor 504 to perform the features of the present invention. Accordingly, such computer programs represent controllers of the computer system 501.

In another embodiment, the invention is directed to a computer program product comprising a computer readable medium having control logic (computer software) stored therein. The control logic, when executed by processor 504, causes the processor 504 to perform the functions of the invention as described herein.

In another embodiment, the invention is implemented primarily in hardware. Implementation of the hardware required to perform these functions described herein will be apparent to persons skilled in the relevant art(s).

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What Is claimed Is:

1. A method for dynamically determining the real-time status of a batch program running on a mainframe computer system, the method comprising the steps of:

(1) accepting as input the name of at least one dataset comprising a plurality of tape volumes;

(2) querying a tape management system to retrieve information about each of the plurality of tape volumes, the plurality of tape volumes being organized into sequential pairs;

(3) capturing recently updated information, including which batch program most recently utilized each of the plurality of tape volumes and the date and time when each of the plurality of tape volumes was accessed;

(4) deriving an elapsed time by comparing a first tape volume with a second tape volume within each of the sequential pairs comprising the plurality of tape volumes;

(5) excluding misleading elapsed time data as derived in step (4) and determining the most recently accessed tape volume of the plurality of tape volumes;

(6) calculating the elapsed time between the current real time and the time when the most recently accessed tape volume was accessed as determined in step (3).

2. The method of claim 1, further comprising the step of reporting the batch programs to have utilized the at least one dataset as determined in step (3), the elapsed time determined in step (4), and the elapsed time as determined in step (6).

3. The method of claim 1, wherein the step of deriving an elapsed time by comparing a first tape volume with a second tape volume within each of the sequential pairs comprising the plurality of tape volumes includes subtracting the first tape volume from the second tape volume within each of the sequential pairs.

4. The method of claim 3, wherein subtracting the first tape volume from the second tape volume within each of the sequential pairs comprises using the date and time when each of the plurality of tape volumes was accessed.

5. The method of claim 1, wherein the step of excluding misleading elapsed time data derived by comparing a first tape volume with a second tape volume within each of the sequential pairs comprising the plurality of tape volumes comprises evaluating the elapsed time to determine if it is less than zero and wherein the first tape volume is determined to be the most recently accessed tape volume.

* * * * *